(12) United States Patent
Barnes

(10) Patent No.: US 8,323,511 B1
(45) Date of Patent: Dec. 4, 2012

(54) METHOD AND APPARATUSES FOR CONNECTING SANITIZING AND OTHER DEVICES TO WATER LINES

(76) Inventor: Ronald L. Barnes, Owens Cross Roads, AL (US)

(*) Notice: Subject to any disclaimer, the term of this patent is extended or adjusted under 35 U.S.C. 154(b) by 0 days.

(21) Appl. No.: 13/324,958

(22) Filed: Dec. 13, 2011

Related U.S. Application Data

(60) Continuation-in-part of application No. 12/931,707, filed on Feb. 8, 2011, now Pat. No. 8,075,784, which is a division of application No. 11/906,403, filed on Oct. 2, 2007, now Pat. No. 7,883,622, which is a continuation-in-part of application No. 11/137,890, filed on May 26, 2005, now Pat. No. 7,329,343.

(60) Provisional application No. 60/640,957, filed on Dec. 31, 2004.

(51) Int. Cl.
*C02F 1/76* (2006.01)
(52) U.S. Cl. .................... 210/749; 210/754; 210/167.11
(58) Field of Classification Search ............. 210/749, 210/753, 754, 760, 167.11, 198.1, 232
See application file for complete search history.

(56) References Cited

U.S. PATENT DOCUMENTS

| | | | | |
|---|---|---|---|---|
| 5,365,617 A | * | 11/1994 | Tarr | 4/508 |
| 5,582,718 A | * | 12/1996 | Sobczak | 210/136 |
| 5,810,043 A | * | 9/1998 | Grenier | 137/268 |
| 5,976,385 A | * | 11/1999 | King | 210/754 |
| 6,358,425 B1 | * | 3/2002 | King | 210/764 |
| 6,680,026 B1 | * | 1/2004 | Denkewicz et al. | 422/28 |
| 2010/0032355 A1 | * | 2/2010 | Andrews et al. | 210/167.11 |

* cited by examiner

*Primary Examiner* — Fred Prince
(74) *Attorney, Agent, or Firm* — Mark Clodfelter

(57) ABSTRACT

A method for connecting a chlorine generator to a pipe carrying a flow of water is disclosed. A short section of rigid pipe conveying water to the chlorine generator is configured at an end inserted into the water flow so that the flow forces water into the rigid pipe and into the chlorine generator, and a second short section of rigid pipe that returns chlorinated water from the chlorine generator to the flow of water is configured at an end inserted into the water flow so that the flow draws the chlorinated water into the flow. A single clamp around the pipe carrying the flow may be used to mount both sections of short rigid tubing to and from the chlorine generator.

20 Claims, 6 Drawing Sheets

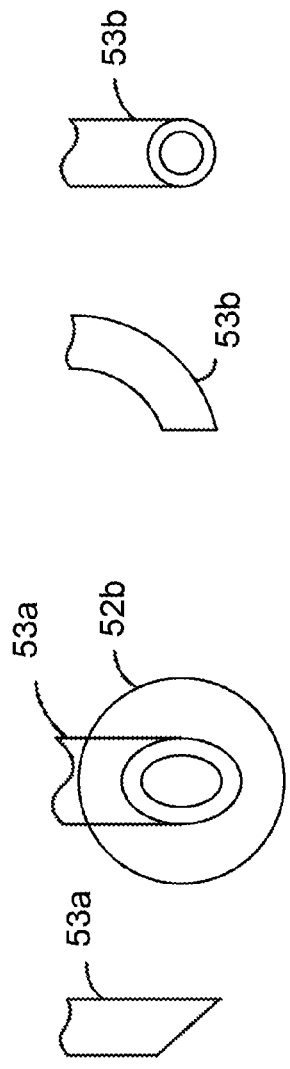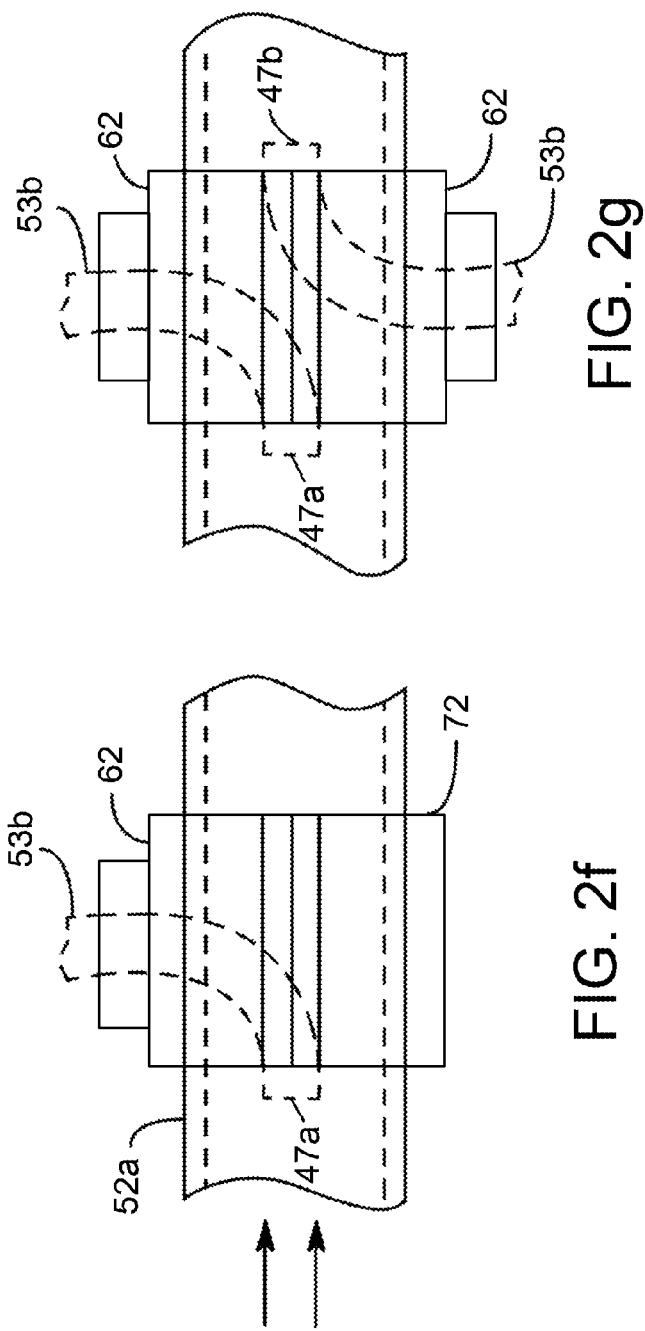

METHOD AND APPARATUSES FOR CONNECTING SANITIZING AND OTHER DEVICES TO WATER LINES

CROSS REFERENCE TO RELATED APPLICATIONS

This application is a continuation-in-part of Applicant's U.S. application Ser. No. 12/931,707, filed Feb. 8, 2011, now U.S. Pat. No. 8,075,784, issued Dec. 13, 2011, which is a divisional application of Applicant's U.S. application Ser. No. 11/906,403, filed Oct. 2, 2007, now U.S. Pat. No. 7,883,622, issued Feb. 8, 2011, which is a continuation-in-part of Applicant's U.S. patent application Ser. No. 11/137,890, filed May 26, 2005, now U.S. Pat. No. 7,329,343, issued Feb. 12, 2008, and which claimed the benefit of Applicant's provisional application No. 60/640,957, filed Dec. 31, 2004. Applicant's patent application Ser. Nos. 12/931,707, 11/906,403, 11/137,890 and provisional application No. 60/640,957 are hereby incorporated by reference in their entireties.

FIELD OF THE INVENTION

This invention relates to methods and apparatuses for connecting sanitizers, mixers and other devices to water lines, and particularly to a method wherein such a device is connected directly to a water line without any need for cutting completely through the water line.

BACKGROUND OF THE INVENTION

Increasing use of ozone in treatment of water in swimming pools, spas, whirlpool bath facilities, and other applications has lead to a need for greater flexibility and more efficient methods and devices for use and installation of equipment used to inject ozone and other chemicals, such as chlorine, into water or other fluids being treated. This is particularly true for those situations and applications wherein an ozone or chlorine related treatment capability is being added as a retrofit to existing plumbing associated with aforementioned pools, spas, bathing facilities, or other applications.

It has become a relatively common practice to generate chlorine, for use in swimming pools, spas, and other water treatment applications by electrolysis of a solution containing a chlorine salt. In conventional practice, common salt (NaCl) is dissolved in pool or spa water. An electrolysis cell, sometimes called a salt chlorine generator, or simply "salt generator," may be installed in series with a pump and filter in a main line water circulation loop and used to electrolyze pool water to generate free chlorine from the brine solution. However, this entails cutting the water line, typically just before the water is returned to the pool from the pump, filter and perhaps other devices, in order to prevent the newly chlorinated water from passing through such devices and possibly damaging them. After the water line is cut, the salt generator is installed and the water line spliced or otherwise attached to the salt generator so that the pool (or spa) water flows through the salt generator before being returned to the pool. This is a relatively laborious process that can involve the use of various tools, and in some instances the use of potentially harmful glues, which also raise the possibility of having leaks after installation if the gluing process is improperly done. In other instances a size of the water line may be different from a size of an inlet and outlet of the salt generator, which requires locating and installing adapters and bushings in order to complete the installation. In other instances it is necessary to drain the pool down to the level of the return pipe of the pool in order to perform the installation. As such, there is a need for methods and apparatuses for efficiently and adaptably installing water sanitizing devices, such as chlorine generators, and other devices such as mixers, in an existing water line such as a return line or other line to or from a swimming pool, spa or the like, without having to completely cut the line.

BRIEF DESCRIPTION OF THE DRAWINGS

FIGS. 2b and 2c are side and front views showing how a smaller tube inserted in a flow of water is configured to force a flow of water into and through the smaller tube.

FIGS. 2d and 2e are side and front views showing how a tube with a curved section can be configured to force a flow of water into and through a smaller tube.

FIG. 2f is a side view showing use of the tube of FIGS. 2d and 2e.

FIG. 2g is a side view of an existing larger pipe showing use of an inlet tube and an outlet tube in conjunction with a single clamping apparatus to develop a flow between the inlet tube and outlet tube.

DETAILED DESCRIPTION OF THE DRAWINGS

Figure 1:
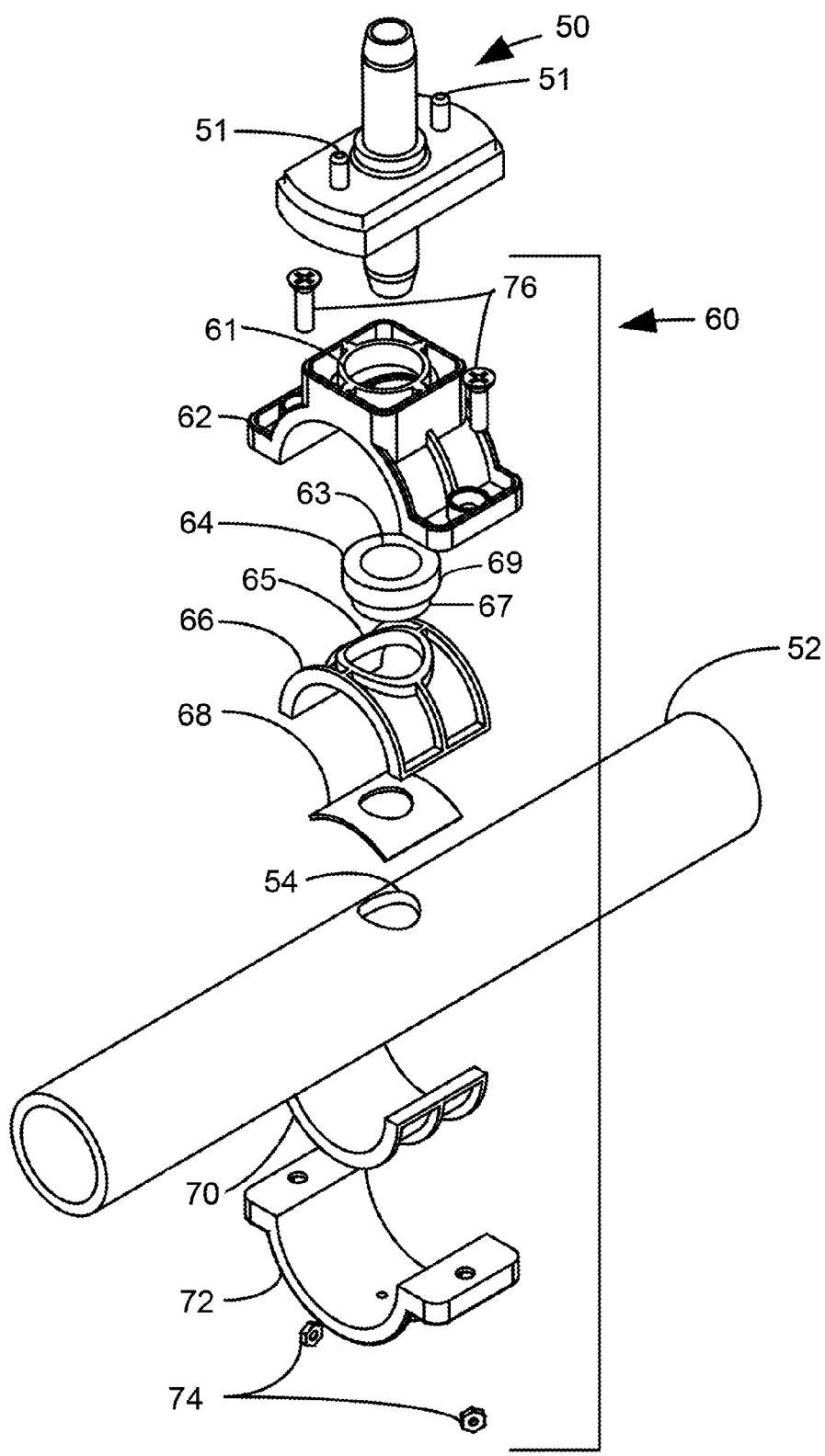
FIG. 1 is an isometric exploded view of one embodiment of an adaptable clamping apparatus of the instant invention for inserting an end of a small pipe into a flow of water in a larger pipe.

FIG. 1 provides an exploded view of my new adaptable clamp that includes novel and unobvious features to support adaptation and installation on pipes of different diameters, and to provide features and flexibility for efficient installation of devices such as a Venturi device or just a straight tube as needed on a particular installation. Having an adaptable clamp design that can adapt to pipes of different diameters reduces the number of different components an installation or repair technician must stock or take to a job site, and increases likelihood that components needed to complete a given installation are instantly available. In addition, an adaptable clamp of the instant invention provides for direct installation of a Venturi, such as disclosed in Applicant's prior patents, or for direct installation of another injection or mixing device.

Still referring to FIG. 1, an adaptable clamp 60 and installation thereof on a smaller pipe 52, e.g., 1.5 inch diameter, is shown. In this installation, compressive force may be provided by outer sections 62 and 72 in conjunction with fasteners, such as screws 76 and nuts 74. In another embodiment, outer sections 62 and 72 may be hinged on one side and a fastener such as a screw, rivet, pop rivet, or a push-through fastener with a gripping section that expands to hold items together may be used to apply or maintain a compressive force on a side opposite the hinge. In some cases, tools such as pliers or C-clamps may be used to compress sections 62 and 72 together around a pipe so that these outer sections may be secured in a compressed state using clips, clamps, rivets, or other fasteners or holding devices. For some embodiments, clips or clamps having a V-shaped channel with retaining ridges may be driven or compressed with a C-clamp onto one or more extended edges of sections 62 and 72 to draw the sections together around a pipe and secure them in place. Since dimensions of outer sections 62 and 72 are sized so as to permit direct installation of these sections on a pipe of larger diameter (e.g., 2.0 inch pipe), then additional sections 66 and 70 serve as shims for installation on a smaller diameter pipe. Multiple sections 66 and 70 of different thicknesses to accommodate smaller diameter pipes of different sizes may be used and may be packaged with one or more adaptable clamps to enhance likelihood that shims of required thickness will be available for a particular installation. In one embodiment, shim sections 66 and 70 may each comprise a plurality of thinner shims with each thinner shim having a thickness, for example, of $\frac{1}{16}$ inch, so that one or more thinner shims could be removed to accommodate installation of an adaptable clamp on a pipe of larger diameter than a smallest diameter pipe on which an adaptable clamp of the instant invention could otherwise be installed. A pad or gasket 68 which may be made of silicone rubber, butyl rubber, polyurethane, VITON™ or other similar material, may be used to provide additional sealing where necessary between section 66 and an opening 54 created in pipe 52 before installation of adaptable clamp 60. Opening 54 is preferably created by use of a hole saw (nominally of $\frac{7}{8}$ inch diameter in the current example) to avoid a risk of splitting plastic pipe 52 through use of a standard twist or flat-bladed drill, although a standard drill may be used successfully with adequate care. As a feature of the invention, a grommet 64 fabricated as a single piece of compressible resilient material, such as a silicone rubber material, butyl rubber, polyurethane, VITON™ or other similar material. As shown, grommet 64 is provided with a lower region 67, which may be cylindrical or which may have a tapered conical shape, that fits through an opening 65 in section 66 and may press against gasket 68 or side of pipe 52*a*. An upper region of grommet 64 is provided with a shoulder 69 that butts and seals against a cavity 59 (FIG. 2*h*) in an underside of clamp section 62. For installation locations where a Venturi 50 or other injection or mixing device is needed, an extended cylindrical section 53 (FIG. 2) (having nominally the outer diameter of ½ inch pipe in the current example) of Venturi 50 may be inserted directly into elongated opening 61 in section 62 and into opening 63 in grommet 64 before fasteners 76 are tightened. In other instances, if only an open passageway is needed, a short length (e.g., approximately 3 inches) of pipe or rigid tubing of appropriate diameter may be inserted through elongated opening 61 in section 62 and generally into or through opening 63 in grommet 64. As fasteners 76 are tightened, sidewalls 57 (FIG. 2*h*) of opening 61, which may optionally be tapered as shown by dashed lines 57*a* to form a conical surface, and a lip 55 formed at an upper end of opening 61, bears against shoulder 69 of grommet 64 and applies compressive forces to an opposite end 67 of grommet 64, which may optionally also be tapered into a mating conical shape, forcing an inner diameter of grommet 64 against cylindrical portion 53 of Venturi 50 (or other rigid tubing) inserted through openings 61 and 63. Also, an end 69 of grommet 64 is forced against optional gasket 68, which in turn forces gasket 68 tight against pipe 52, or an end 69 of grommet 64 is forced directly against pipe 52, thereby providing compressive seals that prevent leakage.

Figure 2A:
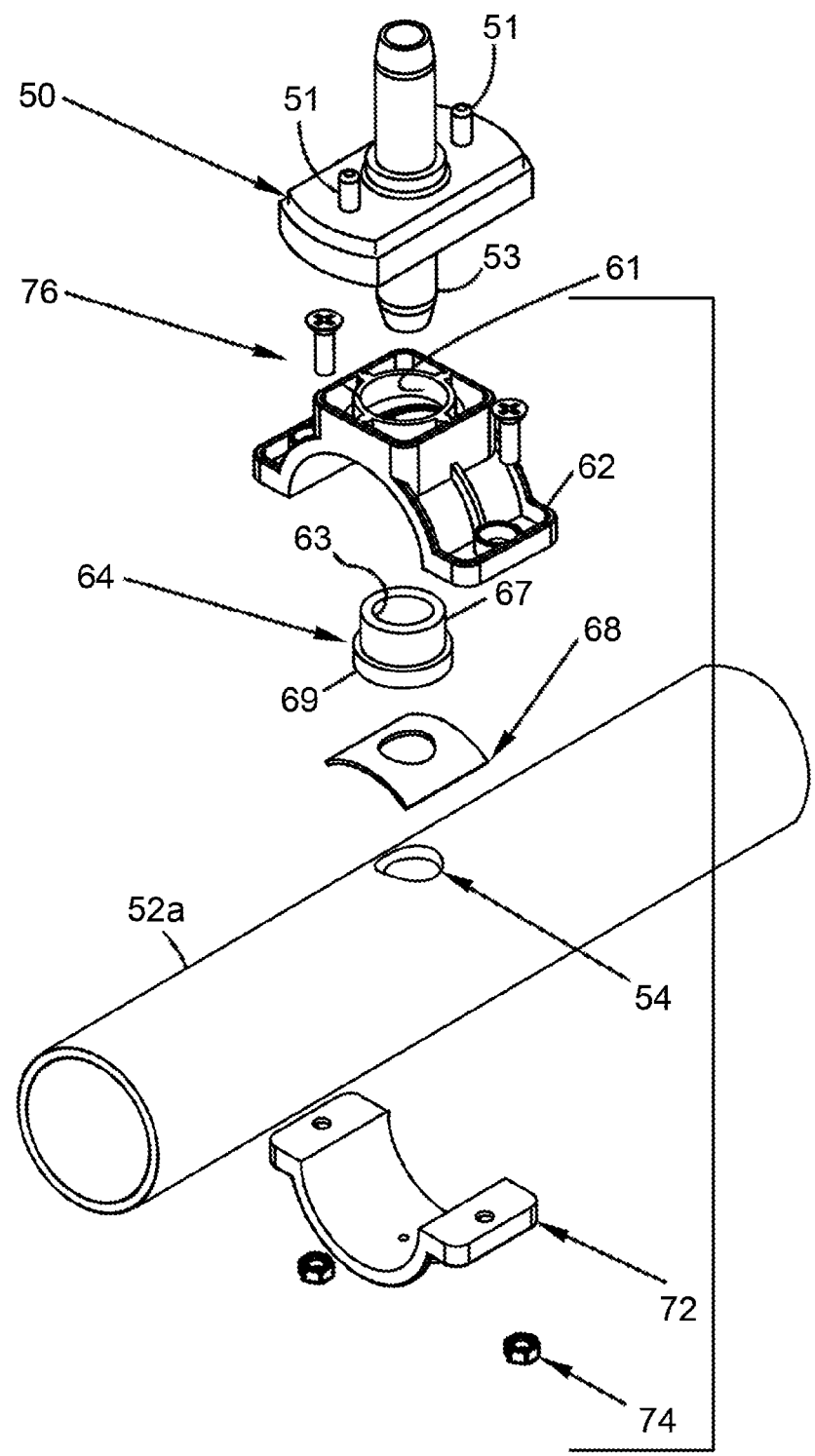
FIG. 2a is an isometric exploded view of another embodiment of the clamping apparatus of FIG. 1.

In certain applications where a position of an inlet end of a Venturi extension tube 53 is to be located in a desired position relative to a cross-section of a flow of fluid in a main pipe, the design of adaptable clamp 60 provides for positioning the inlet end of Venturi 50, or other rigid tubing, outside of a main flow or at any position within a cross-section of a fluid flow within main line pipes. For many installations, a section of flexible tubing may be slipped over an exposed end of Venturi 50 or aforementioned short length of tubing and secured with a hose clamp or the like to establish a desired routing for fluids and to prevent leakage. Referring to FIGS. 1 and 2*a*, sections 62, 66, 70 and 74 of adaptable clamp 60 may be typically fabricated of PVC or another rigid plastic, preferably a plastic that can be injection molded, but for some applications, may be made of aluminum or other metal. Where the clamp is fabricated of stronger materials, reinforcing ribs and other strengthening characteristics illustrated in FIG. 1 may not be required.

It should be noted that Applicant's particular feature of a grommet 64 to provide a seal between an inserted tube and a pipe offers several benefits over saddle clamps of the prior art that typically employ a threaded connection through a flow-connecting portion of a clamp. Use of Applicant's grommet 64 not only supports reversible use of the grommet with different sizes of main line pipe, but also permits use of Applicant's adaptable clamp with intersecting unthreaded tubing, which unobviously provides greater flexibility in adjusting the depth of installation of a bypass intake or return line within a main line pipe to thereby help control bypass flow, and also unobviously permits optional use of bent sections to promote intake or return flow as illustrated in FIGS. 2*f* and 2*g*.

When adaptable clamp 60 is used to provide a connection to a pipe 52*a* of a larger diameter within its adaptable range, as illustrated in FIG. 2*a*, inner sections 66 and 70 are omitted from the assembly and grommet 64 is reversed so that the extended portion 67, which, as noted, may be conical in shape, is inserted into an innermost end of opening 61 in section 62. As noted, sidewalls 57*a* (dashed lines) of opening 61 may optionally be tapered to provide a conical shape, as illustrated in FIG. 2*h*. In this configuration, the diameter of an opening created when sections 62 and 72 are assembled around a pipe 52*a* of larger diameter is sufficiently close to the diameter of the surrounded pipe 52*a* so that section 62 provides a compressive force against grommet 64, compressing an inner diameter of grommet 64 against an inserted pipe or section 53 of a Venturi 50, and compressing a shoulder of end 69 of grommet 64 against a gasket 68 or the pipe surface as described above A seal around an inserted pipe or extension tube 53 of Venturi 50 is provided by internal compression forces applied by lip 55 (FIG. 2*h*) and inner walls of opening 61, which may also be tapered as described above.

Inserted tube 53*a* in FIGS. 2*b* and 2*c* illustrate how an intake end of an extended cylindrical tube 53 of a Venturi 50, or an end of a simple rigid tube, could be cut at a slant and positioned in adaptable clamp 60 such that the open end faces into a direction of fluid flow in a main line pipe to enhance intake flow into a bypass loop, or facing away from the flow of fluid in a main line pipe to enhance an outlet or return flow from a bypass loop. The angle of the slanted cut may be varied to control the degree of flow enhancement through the bypass loop. In addition, position of an inserted tube 53*a*, and a diameter of inserted tube 53*a*, relative to an inner diameter 52*b* of a main line tube, may be varied in order to further enhance flow through a bypass loop.

Referring to FIG. 2*f*, inserted tube 53*b* in FIGS. 2*d* and 2*e* illustrate how an intake end of an extended cylindrical tube 53 of a Venturi 50, or an end of a simple rigid tube, may be formed into a curved section and positioned with its open end facing into a flow in a main line pipe, to enhance intake flow into a bypass loop. Conversely, the open end may be reversed to enhance return flow from a bypass loop. So that reversible grommet 64 may still be slipped onto a section of an inserted pipe 53b and provide a compressive seal, care must be taken in forming a curved section to avoid significant cylindrical deformation in the portion against which reversible grommet 64 seals, and to insure the radius of curvature will permit reversible grommet 64 to be slipped over an end of an inserted pipe 53b during fabrication or during installation of adaptable clamp components. In yet another configuration, illustrated in FIG. 2i, an end 58a of an inserted pipe 53c may be capped, crimped, or otherwise sealed, and an opening 49a may be formed in a side of the inserted pipe, with the opening facing into or away from a main line flow to achieve similar results as above.

Figure 2I:
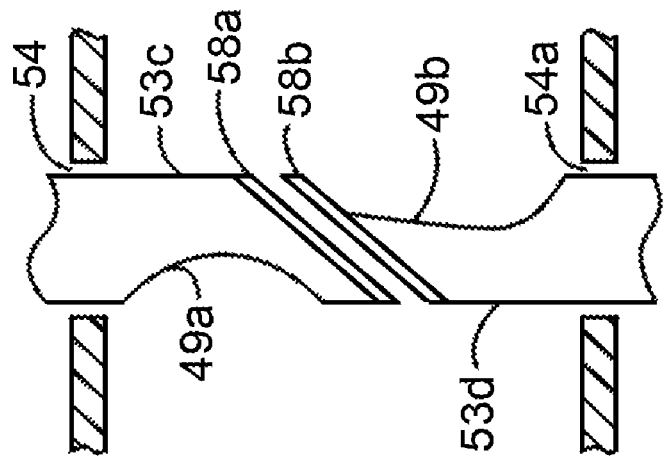
FIG. 2i is a second illustration showing an inlet tube and an outlet tube mounted using a single clamping apparatus in an existing water pipe wherein the inlet tube and outlet tube are configured to use existing water flow to develop a flow of water between the inlet tube and outlet tube.
Figure 2H:
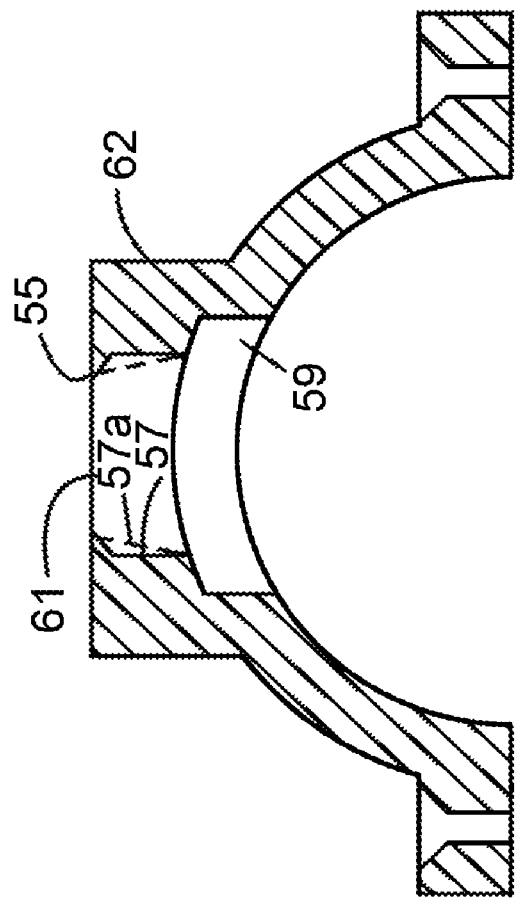
FIG. 2h is a cutaway sectional view of one portion of an adaptable clamp of the instant invention showing how opening may be shaped to enhance mold release and compression of a grommet.

FIGS. 2g and 2i illustrate another innovative application of components of an adaptable clamp of the instant invention. In an application where only moderate flow through a bypass loop is desired, or in an application where insufficient room or access to a pipe precludes installation of intake and return segments of a bypass loop in different locations along a main line pipe, then, as shown in FIG. 2g, two sections 62 of adaptable clamp components may be used and installed on opposite sides of a main line pipe, with an open end 47a of one inserted tube 53b facing into the flow to provide an intake for a bypass loop, and an open end 47b of a different inserted tube 53b facing away from the flow to provide a return flow for a bypass loop. In yet another embodiment, as illustrated in FIG. 2i, ends 58a, 58b of inserted tubes 53c, 53d could be cut at a slant and sealed, and elongated openings 49a, 49b may be formed in side walls of the inserted tubes 53c, 53d, with said openings 49a, 49b alternately facing into or away from fluid flow in a main line pipe, thereby promoting flow through a bypass loop. Opening 49b in FIG. 2i is shown with an optional different shape from the shape of opening 49a to further illustrate optional measures which may be employed with Applicant's adaptable clamp. To help control bypass flow, the amount of slant and size of openings may be varied from a 90 degree cut, with openings which may be elongated up to approximately one-half the diameter of the main line pipe, up to a cut slanted so that a sloped end of an inserted pipe approximately spans the inner diameter of the main line pipe, with an opening which may be elongated to approximately the diameter of the main line pipe. Tubes inserted from either side may be positioned with their slanted ends adjacent, but with their respective openings facing in opposite directions, so as to enhance intake and return flows as described above.

Since there is a risk that creating a second opening 54a in an opposite side of a main line pipe could cause a loss of structural strength in a main line pipe, adhesive gasket tape, or pipe adhesive, cement, or caulk may be used to bond components 62 of an adaptable clamp to outer walls of main line pipe in order to reinforce a main line pipe.

Figure 3:
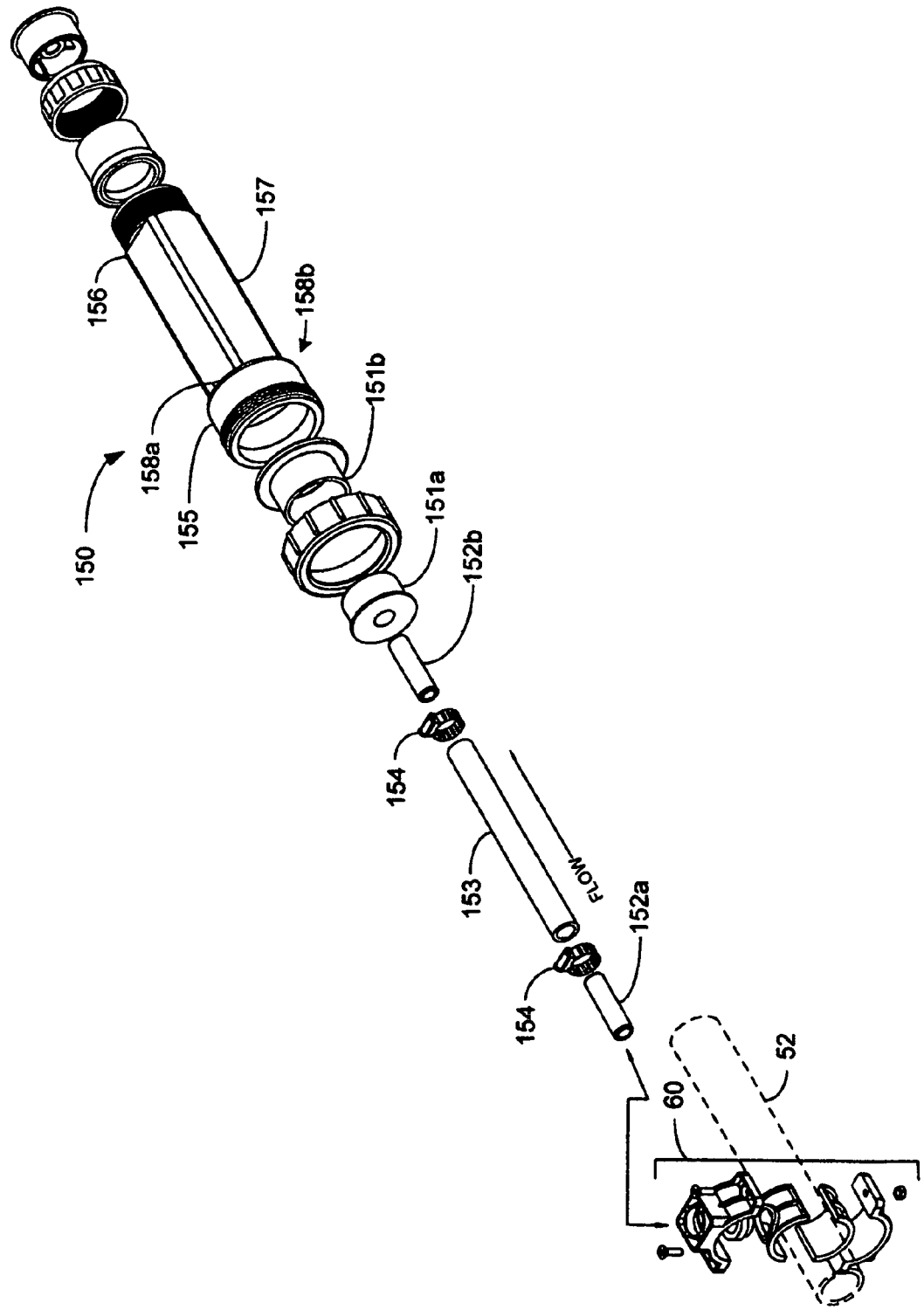
FIG. 3 is an illustration of a salt chlorine generator having at least an inlet tube mounted in an existing water pipe using a single clamping apparatus.

It was noted earlier herein that it has become a relatively common practice to use chlorine generators to generate chlorine from a salt solution by electrolysis. FIG. 3 illustrates how a conventional salt chlorine generator module 150, designed to be installed in series in a typical 1.5 inch to 2 inch diameter main line pump and filter circulation loop for a swimming pool or other bathing facility, may instead be installed in a bypass loop using Applicant's adaptable clamp 60 together with compressible reducing bushings 151a, 151b, short lengths of rigid tubing 152a, flexible tubing 153 of vinyl (or other ozone resistant material), and hose clamps 154 to provide a bypass flow from a main line pipe 52 to an inlet end 155 of salt chlorine generator module 150. Similar fittings (not illustrated) may be used to continue bypass flow from an outlet end 156 of chlorine generator 150 to other elements of a bypass loop or to another adaptable clamp 60 for return to a main flow pipe, or using a single clamp as shown in FIGS. 2g and 2i.

Figure 3B:
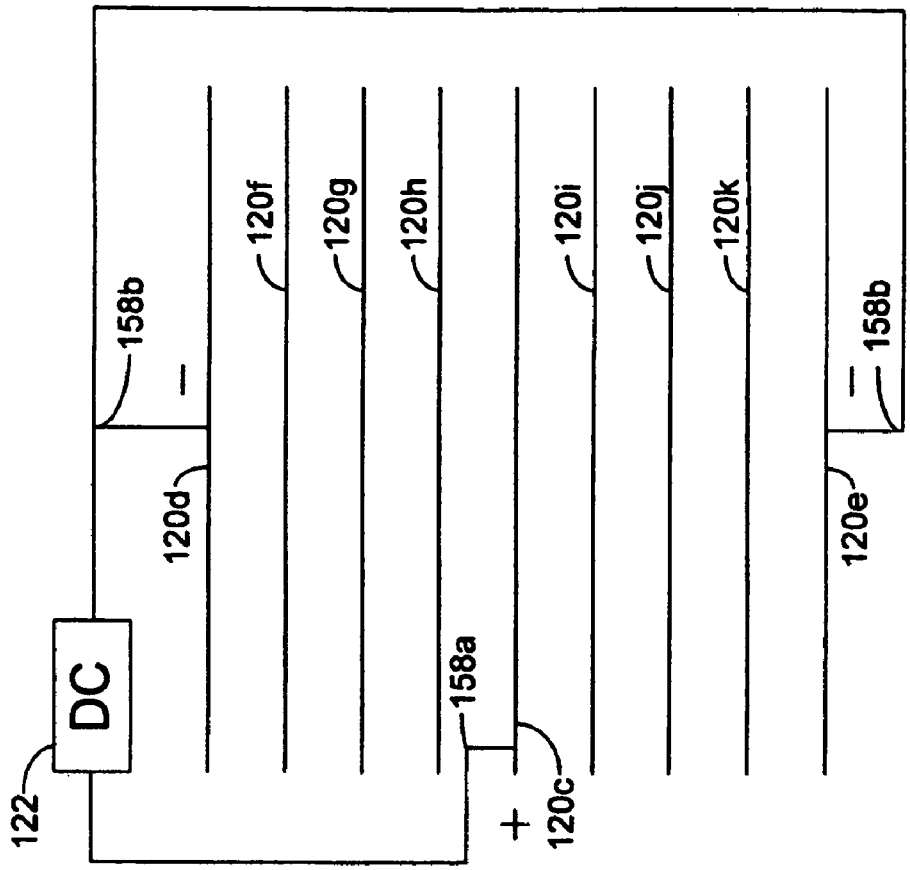
FIGS. 3a and 3b are plate configurations of a chlorine generator of the instant invention.
Figure 3A:
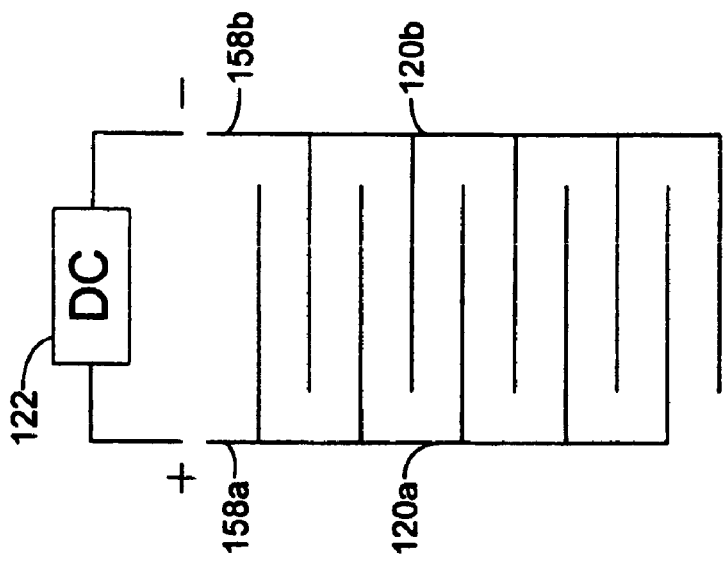

In this type of salt chlorine generator 150, when conventionally installed in a main line of a typical pool filter circulation loop using conventional plumbing fittings, a brine solution resulting from addition of common salt (NaCl) to water in a swimming pool or spa flows through salt chlorine generator module 150. Module 150 may be a length of PVC pipe having a typical diameter of approximately 2 inches but which may also contain a section 157 having a generally rectangular cross section that includes a set of generally parallel electrodes which extend down a portion of the length of module 150 and which are separated by a distance which, in some embodiments, may be only a few millimeters, and arranged so that water containing salt may flow between the electrode plates. Electrode plates may be in a nested configuration, as illustrated in FIG. 3a, or in a stacked configuration as illustrated in FIG. 3b. Electrically conductive paths from internal electrode plates to an exterior of module 150 may be provided via terminals 158a (FIG. 3), 158b (not visible in FIG. 3) which may be located on the same or opposite sides (as illustrated), or in other convenient positions, and which may sealably penetrate walls of module 150, using epoxy or other conventional sealing methods to provide a watertight penetration.

With an electrode plate configuration such as illustrated in FIG. 3a, alternate electrode plates are supplied with a positive or negative voltage through terminals 158a (FIG. 3), 158b (not visible in FIG. 3) from a power supply, which may be any of the power supplies as described later herein, so that voltage between electrode plates is sufficient to cause electrolytic separation of chlorine from the brine solution flowing through generator 150. Some chlorine atoms may combine with other chlorine atoms to form diatomic chlorine gas, but in many cases, monatomic chlorine freed from solution at an electrode plate will rapidly react with organic compounds or organisms, or with other compounds contained within fluid being treated. These reactions of chlorine generally provide treatment through elimination or neutralization of contaminants within a fluid being treated.

Chlorine generating device 120 typically contains a set of electrical plates, or electrodes, with potentials applied thereto maintained by a DC power supply 122. Electrode plates may be made of titanium coated with ruthenium oxide and iridium, the combination of which has been found to promote release of chlorine from brine solution via electrolysis. In some embodiments, electrode plates 120a, 120b may be nested, as illustrated in FIG. 3a, with alternating plates maintained at either a positive or negative potential by wired connections to a DC power supply. In some embodiments, the polarity of the DC power supply may be changed manually or automatically at some interval in order to reduce buildup of deposits of calcium or other minerals on electrode plates. Depending upon concentration of calcium in water, an interval period for changing polarity may be 30 minutes. This schematic in FIG. 3a represents an end-on view of electrode plates that may be extend from less than an inch to several inches wide and which may extend from less than an inch to several inches in a direction of flow (into the page in FIG. 3a), depending upon the size of an electrolysis chamber and the desired quantity of chlorine or other chemical to be separated by electrolysis.

More or fewer plates than shown may be used, but separation with fewer plates may approach dimensions of a structure used to contain an electrolysis cell. For electrode plates in a configuration such as shown in FIG. 3a, and depending upon plate dimensions, separation, and number of plates, only a moderately low voltage (e.g., 6 to 12 volts) is required to produce a relatively large electrolysis current (e.g., 10 to 20 amps) through a brine solution flowing between the plates, which in turn releases chlorine from the brine solution.

In another electrode plate configuration illustrated schematically in FIG. 3b, some conductive electrode plates, 120f-120h and 120i-120k, are not connected to wires but are allowed to have floating electrical potentials between other plates 120c, 120d, 120e connected to a DC power supply. Here, the potential difference between the plates connected to a DC power supply (e.g., plate 120c and plates 120d and 120e) is typically in a range of 20 to 35 volts, but resulting current flow (e.g., 4 to 6 amps) is generally much less than for a nested plate configuration in FIG. 3a. This voltage potential is believed to cause sufficient charge migration on the floating potential plates 120f-120h and 120i-120k such that one side of each plate appears positive with respect to a brine solution flowing through the plates, and the other side appears negative, so that electrolysis of the brine solution to release chlorine occurs between even the floating potential plates on the surfaces coated with ruthenium oxide and iridium. The greater potential gradients within a floating plate arrangement of FIG. 6b, driven by a higher voltage on the electrode plates wired to a DC power source, may also change electrolysis and related chemistry in the brine solution, resulting in release of some level of ozone in addition to chlorine.

Voltage potentials between alternating plates are conventionally maintained within a desired voltage range by a voltage controlling power supply, and, as noted, voltage polarity may be conventionally reversed periodically (e.g., every 30 minutes or so) in order to help reduce buildup of calcium or other deposits on electrode plates (which would eventually increase resistance to current flow and impede desired electrolytic action). However, for many applications, Applicant proposes that a current controlling power supply may provide enhanced or more predictable and better controlled performance by providing better control over rates of ion production and capture and thus rates of freeing of chlorine. A current controlled power supply may vary the applied voltage to maintain constant current and thereby compensate for buildup of corrosion or contaminants on plates or for other losses, and will also reduce likelihood of a damaging short circuit between plates.

Applicant also proposes that electrolysis cells such as described above are compatible with use of switching power supplies, which are capable of providing needed voltages and currents from standard 115 VAC or 220 VAC supply lines without requiring use of large bulky transformers. In addition, phase controllers and/or capacitors may be used in conjunction with a rectified AC power supply to change electrochemistry in an electrolysis cell to produce more ozone in relation to chlorine.

Having thus described my invention and the manner of its use, it should be apparent to those skilled in the relevant arts that incidental changes may be made thereto that fairly fall within the scope of the following appended claims, wherein I claim:

1. A method for connecting a water sanitizer to a water line comprising:
   constructing said water sanitizer as an integrated water sanitizer module having a water inlet and a water outlet,
   forming said water inlet with an opening shaped to cause a flow of water through said water line to force water into said water inlet and through said water sanitizer module,
   forming said water outlet with an opening to return sanitized said water from said water sanitizer module to said flow of water through said water line,
   positioning said water inlet and said water outlet next to each other and in said flow of water using at least one clamping apparatus to said water line.

2. The method as set forth in claim 1 further comprising orienting said opening in said water inlet to face said flow of water, forcing said water into said water inlet and through said water sanitizer.

3. The method as set forth in claim 1 further comprising orienting said opening in said water outlet so that said flow of water causes said sanitized water to be drawn from said water sanitizer module.

4. The method as set forth in claim 3 further comprising orienting said opening in said water outlet away from said flow of water so that said flow of water draws said sanitized water out of said water outlet.

5. The method as set forth in claim 1 further comprising clamping said water inlet and said water outlet to said pipe using a single said clamping apparatus.

6. The method as set forth in claim 5 further comprising using at least a resilient sheet material to seal between said single clamping apparatus and said water line.

7. The method as set forth in claim 5 further comprising completely encircling said water line with said single clamping apparatus.

8. The method as set forth in claim 5 further comprising extending at least said water inlet through said single clamping apparatus, through said water line and into said flow of water in said water line.

9. The method as set forth in claim 5 further comprising extending at least said water outlet through said single clamping apparatus and through said water line.

10. The method as set forth in claim 8 further comprising extending at least said water outlet through said single clamping apparatus, through said water line and into said flow of water.

11. The method as set forth in claim 2 further comprising using the same said at least one clamping apparatus to secure said water inlet and said water outlet to said water line and in communicating relation with said water flow.

12. The method as set forth in claim 1 further comprising mounting a chlorine generator in said water sanitizer module.

13. A method for connecting a water sanitizer to a water line comprising:
   constructing a chlorine generator as an integrated module having a water inlet and a water outlet,
   forming said water inlet with an opening shaped to cause a flow of water through said water line to force water into said water inlet and through said chlorine generator,
   forming said water outlet with an opening to return chlorinated said water to said water line,
   mounting said water inlet and said water outlet next to each other and in communicating relation with said flow of water using a single clamping apparatus to said water line.

14. The method of claim 13 further comprising orienting said opening in said water inlet to face said flow of water through said water line, forcing said water to flow through said chlorine generator.

15. The method as set forth in claim 14 further comprising orienting said opening in said water outlet away from said flow of water flowing through said water line.

16. The method of claim 15 further comprising fabricating said water inlet as a short section of tubing, and inserting said section of tubing through said clamping apparatus, through said water line and into said flow of water.

17. The method as set forth in claim 16 further comprising fabricating said water inlet as a section of straight tubing having a water inlet opening facing said flow of water in said water line, said section of straight tubing extending through said clamping apparatus, through said water line and into said flow of water.

18. The method as set forth in claim 13 further comprising sealing between said clamping apparatus and said pipe using a resilient sheet material.

19. The method as set forth in claim 14 further comprising fabricating said water outlet in communicating relation through said clamping apparatus and through said water line with said flow of water in said water line.

20. The method as set forth in claim 19 further comprising configuring said water outlet as a section of tubing, with said outlet opening facing away from said flow of water.

* * * * *